Sept. 21, 1965    R. F. HOFFMAN ETAL    3,206,807
METHOD OF AND MEANS FOR MAKING CORES FOR IMPELLERS
OF THE FRANCIS TYPE
Filed Oct. 29, 1964    4 Sheets-Sheet 1

ROBERT F. HOFFMAN
EDMUND C. O'GURECK
*INVENTORS*

BY *Daniel A. Bohr*

*Atty*

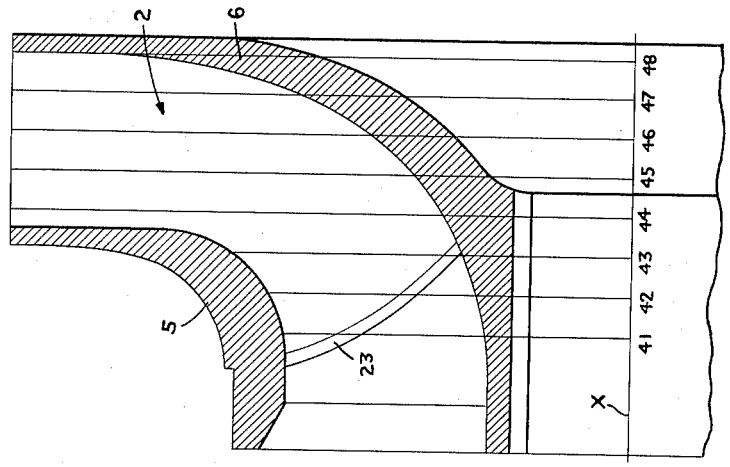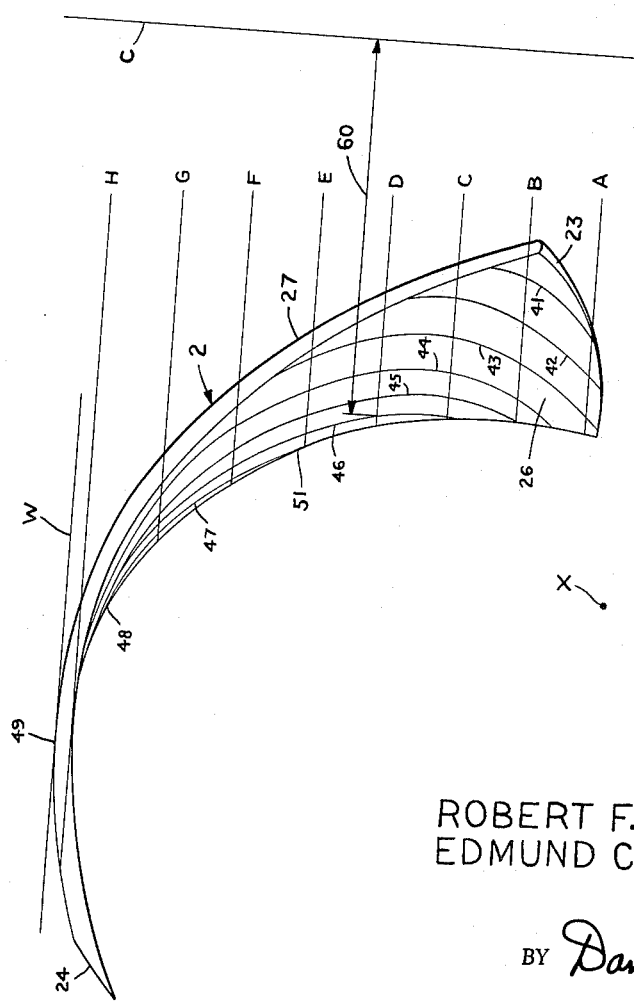

Sept. 21, 1965 R. F. HOFFMAN ETAL 3,206,807
METHOD OF AND MEANS FOR MAKING CORES FOR IMPELLERS
OF THE FRANCIS TYPE
Filed Oct. 29, 1964 4 Sheets-Sheet 3
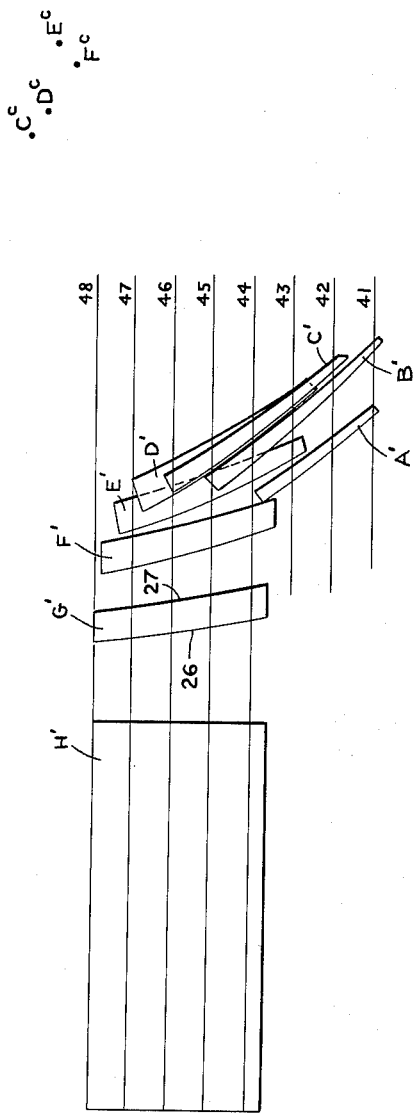
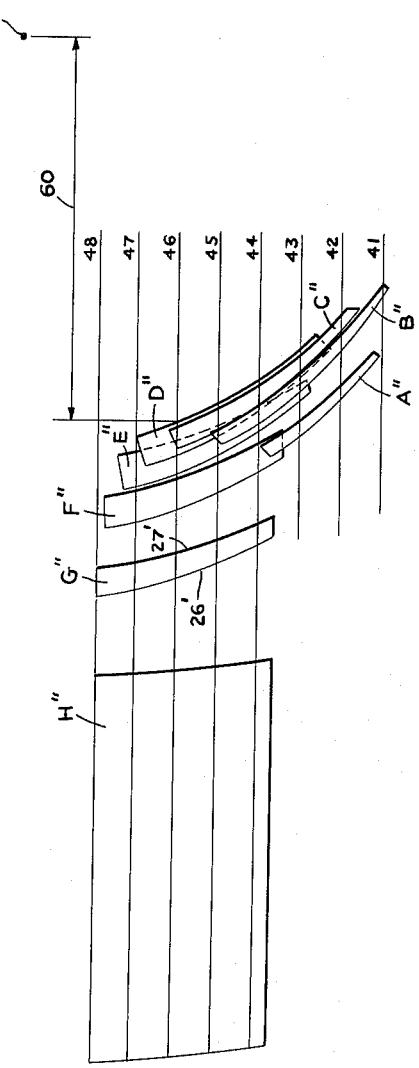
ROBERT F. HOFFMAN
EDMUND C. O'GURECK
INVENTORS
BY Daniel H. Bobis
ATTY Sept. 21, 1965  R. F. HOFFMAN ETAL  3,206,807
METHOD OF AND MEANS FOR MAKING CORES FOR IMPELLERS
OF THE FRANCIS TYPE
Filed Oct. 29, 1964  4 Sheets-Sheet 4

ROBERT F. HOFFMAN
EDMUND C. O'GURECK
*INVENTORS*

BY Daniel A. Bobis

United States Patent Office 3,206,807
Patented Sept. 21, 1965

3,206,807
METHOD OF AND MEANS FOR MAKING CORES FOR IMPELLERS OF THE FRANCIS TYPE
Robert F. Hoffman, Madison, and Edmund C. O'Gureck, North Arlington, N.J., assignors to Worthington Corporation, Harrison, N.J., a corporation of Delaware
Filed Oct. 29, 1964, Ser. No. 411,176
15 Claims. (Cl. 22—13)

This application is a continuation in part of applicants' prior application, S.N. 184,340, filed April 2, 1962, and now abandoned, which prior application was in turn a continuation of applicants' prior application, S.N. 847,835, filed October 21, 1959, and now abandoned.

This invention relates to the manufacture of cores used in foundry practice and more particularly to a method and apparatus used in the production of cores for impellers of the Francis type. The general design characteristics of impellers of the Francis type are believed to be well known in the art and are described in detail, for example, in Chapter 24 of "Fluid Mechanics of Turbo Machinery," published in 1947 by the McGraw-Hill Book Company, Inc.

The intricate configuration of the vane of a Francis type impeller shown in FIGURES 1, 2 and 3 of the drawings has, prior to this invention, prevented the manufacture of this type impeller from a unitary core. More specifically the provision of a twist, $a$, to provide the impeller with required operational characteristics, required that the impeller core be formed by joining together a series of smaller core segments, unless special casting techniques such as the lost wax process are used.

While utilization of the segmental type core or lost wax process permit the ultimate manufacture of a good quality casting, certain significant advantages are provided by fashioning the impeller from a unitary core, as for example:

(1) Dimensional accuracy of the impeller core, as cast, is greatly improved by elimination of segmental construction.

(2) Manufacturing time is significantly reduced by elimination of filing, scraping, and fitting core segments, and pasting of entire assembly together.

(3) Suction tips can be cast to desired contour shape which is not possible with segmental construction.

(4) The relative difficulty, and high expense and time consumption inherent in the utilization of the lost wax, or similar casting processes, are eliminated.

It is therefore an object of this invention to provide a method of manufacturing Francis type impellers, which provides, amongst others, the significant advantages enumerated above.

It is a further object of this invention to provide a method and apparatus for manufacturing a unitary core useful in the production of impellers of the Francis type.

It is another object of this invention to provide a method of designing the vane element of the core pattern in order to permit the manufacture of a Francis type impeller from a unitary core.

According to the general features of the invention there is provided a novel method of designing the vane elements of the core pattern whereby the impeller of the Francis type contemplated herein may be cast from a single unitary core.

More specifically, a vane element, designed to conform to the design characteristics of the impeller vane, is laid out so that the respective configurations of the front and back surfaces of the vane element conform substantially, in a manner described in detail hereinbelow, to circular arcs having a common axis. Fashioning the vane elements in accordance with the above method permits rotatable removal of same from a core box without any distortion of the refractory material as has occurred in the art heretofore.

Other and further features, objects and advantages of the present invention including the simplicity and economy of same will be apparent to one skilled in the art from the following description taken in connection with the accompanying drawings.

In the drawings:

FIGURES 4 and 5 show design layouts of a Francis type vane about the axis of rotation of an impeller in accordance with normal layout procedure.

FIGURE 6 is a design layout of projected sections of the vane of FIGURE 5 taken along parallel planes passed through the said vane.

FIGURE 7 is a design layout of projected vane sections of FIGURE 6 modified so that respective front and back boundaries of the said vane sections conform substantially to circular arcs having a common axis.

Figure 1:
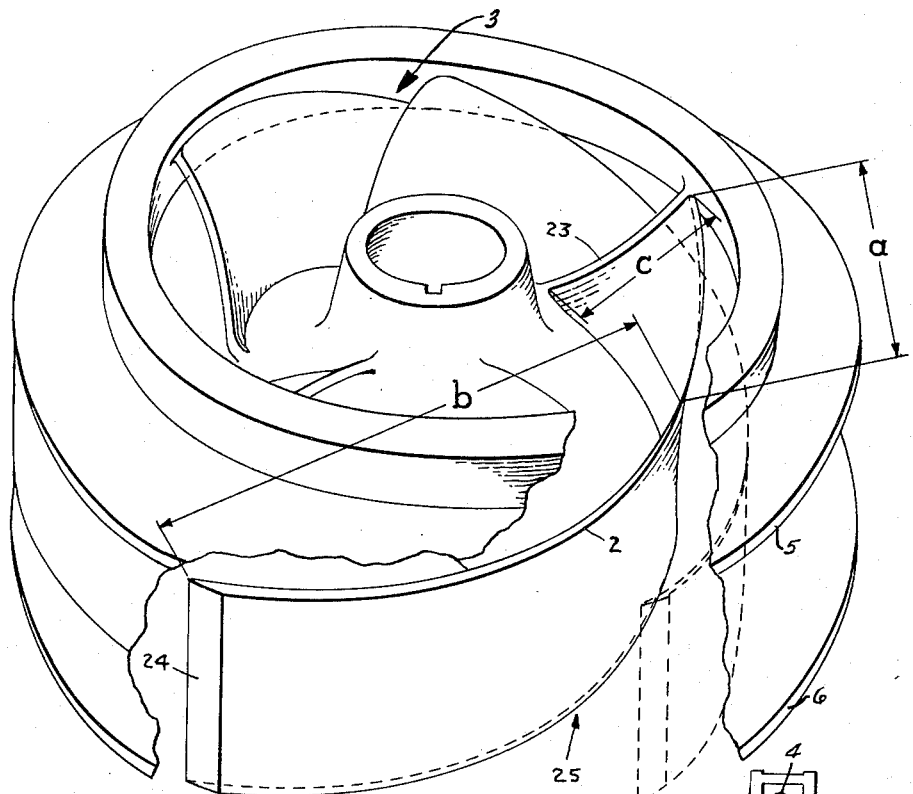
FIGURE 1 is a fragmentary perspective view of a Francis type impeller showing the usual construction of the vanes.
Figure 2:
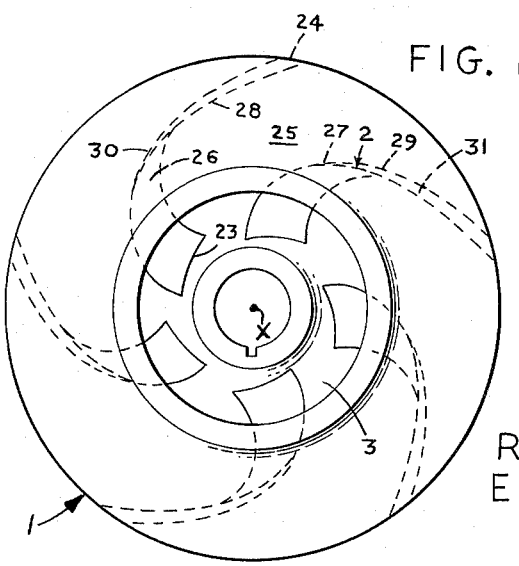
FIGURE 2 is a top view of a Francis type impeller showing position of vanes relative the suction inlet.
Figure 3:
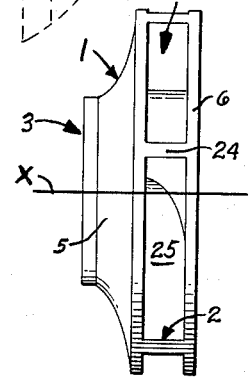
FIGURE 3 is a side view of the Francis type impeller showing position of vanes relative discharge opening.

In advance of a discussion of the details of the methods and apparatus contemplated by this invention, it will be helpful first to consider the general organization and construction of a Francis type impeller as indicated generally at 1 in FIGURES 1, 2 and 3 respectively. The said impeller comprises shrouds 5 and 6, a suction inlet, generally indicated at 3, and a discharge outlet, generally indicated at 4 in FIGURE 3. In operation, the said impeller is rotated about an axis of rotation X as shown in FIGURES 2 and 3.

Referring to FIGURE 1 each vane 2 comprises a twist $a$, a lean $b$, and a curve $c$.

With this type of configuration a desired pumping capability is reached.

In the art the lower end 23 of the vane is referred to as the leading edge and the leading edge is also termed the suction tip.

The trailing edge 24 is formed at the upper end of the vane 2 and provides a desired flow characteristic to the fluid being passed through the pressure developing passages 25 formed between each vane of the impeller.

The pressure developing passages 25 are formed by the vane surfaces 26 on the lower side 28 of one vane 30 and the vane surfaces 27 of the upper side of an adjacent vane 31. These vane surfaces 26 and 27 for convenience will be referred to respectively as the front and back surfaces of the vane and will be designated with the reference characters 26 and 27 in FIGURES 2, 5 and 6, all showing the prior art vane, and for clarity the front and back vane surfaces of the vane fashioned according to the concepts of the present invention will be designated 26' and 27' in FIGURE 7.

Referring more particularly to the drawings, wherein like parts have been given the same reference characters, FIGURES 4 and 5 show an impeller vane 2 of Francis type configuration laid out about the axis of rotation X of the impeller 1 in accordance with the usual design practice. There are a number of accepted methods of accomplishing the foregoing vane layout and because these methods are all well known to those skilled in the art it is believed that the mechanical details of this usual method of vane layout need not be described in further detail.

As was mentioned generally hereinabove, in the past an individual pattern element was fashioned to conform to the above vane and used to produce a core segment which was then joined to other core segments to provide a single core for use in casting the impeller. Of course, it was necessary to manufacture cores in accordance with the above practice because of the difficulty encountered in stripping a unitary core pattern from the mold without damaging same.

However, with the concepts disclosed by this invention it is now possible to accomplish the manufacture of a Francis type impeller from a unitary core to thereby provide a better quality casting and without the disadvantages enumerated above associated with the former practice of manufacturing the casting from a segmental type core.

Figure 10:
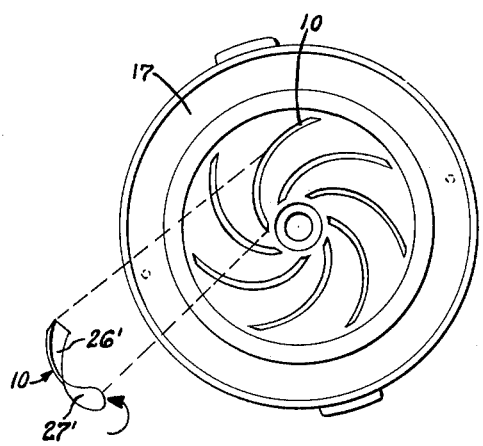
FIGURE 10 is a bottom view of one form of core-making means contemplated herein showing a vane element striped from the core box, and illustrates the manner in which the said stripping is accomplished.

More specifically, a pattern element 10 shown in FIGURE 10 of the drawings is fashioned to conform to a Francis type vane laid out so that the front and back boundaries 26′ and 27′ of incremental cross-sections taken along parallel planes passed therethrough, conform to circular arcs laid out about a common axis as seen in FIGURE 7.

Describing the foregoing concept in detail and, furthermore, showing one method of accomplishing the fashioning of a vane 2 so that the surface configurations thereof conform to circular arcs laid out about a common axis; the vane 2 is laid out about the axis of rotation X of the impeller 1 in accordance with any of the accepted methods known in the art as shown in FIGURES 4 and 5.

A plurality of parallel, equally spaced planes 41 through 48 inclusive, each of which is perpendicular to the said axis X are then passed through the vane layout of FIGURE 4 to result in the generation of the surfaces of revolution as indicated by lines 41 through 48, inclusive, on the front surface 26 of the vane 2 in the vane layout of FIGURE 5. A plane W which is tangent to the back surface 27 adjacent the trailing edge 24, of the vane 2 along the line 49 on the said back surface where the said surface passes through the vertical (assuming the impeller 1 to be horizontally oriented as depicted in FIGURE 1) is then drawn as shown in the vane layout of FIGURE 5. It is to be understood that if the design characteristics of the vane do not result in a back surface of the vane which passes through the vertical adjacent, or at the trailing edge of the vane, as would occur, for example, in the case of a vane with substantially less lean than that of vane 2, the layout of the vane with insufficient lean for purposes of locating the plane W is projected to result in a projected back surface thereof which passes through the vertical, whereby the location of the plane W relative to the vane may be established by use of the said projected back surface.

Once the location of plane W has been established, a plurality of equally spaced planes A through H, inclusive, each of which is parallel to the said plane W, are passed through the vane layout of FIGURE 5 in the manner made clear by the said figure. The incremental cross sections A′ through H′, inclusive, of the vane 2 generated by the passage therethrough of the said parallel planes A through H, inclusive, are then drawn in the same plane, i.e. the plane of the drawings, using intersections of the said parallel planes with the planes 41 through 48 as guides in the manner depicted in FIGURE 6. It is to be understood that although the use of equally spaced parallel planes 41 through 48, and A through H, inclusive, facilitates the vane design process, it is not essential that the said planes be equally spaced. The determination of the respective shapes of the said incremental vane sections is made through the utilization of well known principles of descriptive geometry as described in detail, for example, in "Engineering Drawing" by Thomas E. French, et al., Section 14.14 "Determination of an Intersection of a Plane and a Surface of Revolution," 8th Edition, published in March 1953, by the McGraw-Hill Book Company. A greater or lesser number of the incremental vane sections A′ through H′, inclusive, may of course by provided by increasing or decreasing the number of parallel planes A through H, inclusive, which are passed through the vane layout of FIGURE 5. Thus, FIGURE 6 depicts the incremental cross sections of a conventional Francis type impeller vane and, as should be readily apparent from the said figure, the front and back boundaries 26 and 27 of the respective incremental cross sections A′–H′, inclusive, do not conform substantially to circular arcs having a common axis. Since the vane elements used in the casting of impellers must of course correspond precisely in shape to the vanes of the impeller, this lack of a common axis makes impossible the establishment of a common axis of rotation for vane element withdrawal from a casting core, whereby the advantageous production of a unitary core for casting impellers of the Francis type is similarly made impossible without the disadvantageous use of special casting processes as discussed hereinabove.

To this effect, that is the establishment of a common axis of rotation for vane element withdrawal from a casting core and the attendant advantageous possibility of the use of a unitary core, the respective front and back boundaries 26 and 27 of each of the incremental vane cross sections A′ through H′, inclusive, are modified to conform substantially to circular arcs having a common axis in the manner depicted by incremental vane sections A″ through H″, inclusive, in FIGURE 7. This may be accomplished by trial and error by locating the centers of the respective circular arcs which, starting from the suction inlet 3, most nearly approximate the respective configurations of the vane sections A′ through H′, inclusive. For example, as seen in FIGURE 6, the center of the circular arc most nearly approximating the configuration of vane section C′ is at $C^c$, for vane section D′ it is at $D^c$, for vane section E′ at $E^c$ and for vane section F′ and $F^c$. After a center point has been located for the circular arc most nearly approximating the configuration of each of the said vane sections, the said center points are utilized in the determination of the location of a common axis C which will provide the front and back boundaries 26 and 27 of the respective vane with circular configurations and at the same time provide the overall vane with the requisite characteristics of a Francis type vane.

Using the common axis C as a center point, the front and back boundaries 26′ and 27′ of the respective incremental vane sections are then modified by being redrawn as circular arcs about the said common axis C in the manner made clear by the respective configurations of vane sections A″ through H″, inclusive, in FIGURE 7. The respective configurations of the front and back boundaries 26′ and 27′ of the said vane sections A″ through H″ as seen in FIGURE 7 are then slightly modified to provide the vane element with sufficient draft, that is, angularity in a manner well known in this art to facilitate the removal of the vane elements from a unitary core with absolutely minimum disturbance of the latter. Thus, the incremental cross sections, taken in the manner described hereinabove, of the vane elements 10 of FIGURE 10 may be understood to have front and back boundaries which conform substantially to circular arcs having a common axis C, which common axis is, of course, the common axis of rotation for vane element withdrawal referred to hereinabove.

Methods other than the trial and error method of determining the optimum location of the said common axis C relative to the said incremental vane sections will occur to those skilled in this art and may, for example, include the determination of the configurations of the base line 51 and suction tip 23 (FIGURE 5) of the vane 2 through the use of conventional Francis type vane design techniques, and the application of known principles of descriptive geometry thereto to determine the said optimum axis location.

The location of the said common axis, or common axis of rotation for vane withdrawal, C, relative to the vane layout of FIGURE 5 may be readily established by measuring the distance along any one of the planes 41 through 48, inclusive, as seen in FIGURE 7, between the said common axis and the intersection of any of the incremental vane sections A″ through H″, inclusive, and any of the said planes. Thus, for example, the distance 60 between the intersection of vane section D″ and plane 46, and the common axis C as seen in FIGURE 7, may be marked off as seen in FIGURE 5 to determine the location of the said common axis relative to the vane layout of the latter figure. After the respective configurations of the cross-sections A″–H″ (FIG. 7) have been determined, the same may be used, for example, in conjunction with conventional pattern making techniques to form a vane pattern element of the desired design. Thus, if the vane pattern element is to be made of wood, a block of a suitable wood of proper size is chosen, the spaced, parallel planes A–H laid out thereon as in FIGURE 5, and the surfaces of the vane pattern element formed, by selective removal of portions of the wood, to conform with the said cross-sections at each of the correspondingly identified planes. It is believed that other conventional methods of using the said cross-sections to form a vane pattern element of the desired design, will occur readily to those skilled in the art.

One form of core-making means 11 used in the manufacture of the core contemplated herein comprises a body portion generally designated 12 including a cavity therein for removably receiving the vane elements 10 having front and back surfaces conforming to the vane laid out in accordance with the method described hereinabove, as depicted in FIGURE 7.

Figure 8:
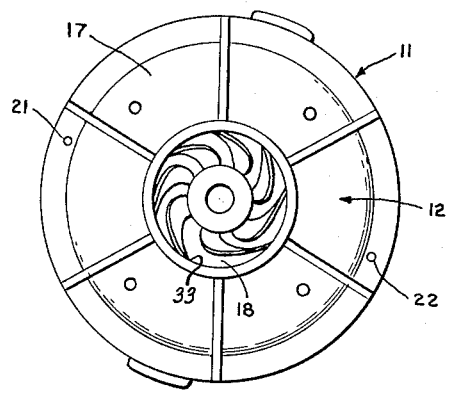
FIGURE 8 is a top view of one form of core-making means contemplated by this invention.
Figure 9:
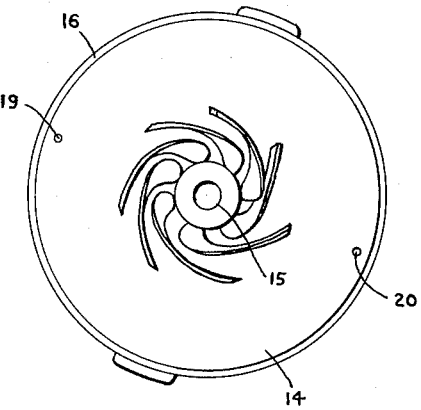
FIGURE 9 is a top view of the core-making means of FIGURE 8 with the top portion removed.

More particularly the core-making means 11 shown in FIGURES 8, 9 and 10 comprises a drier 14 of circular configuration including an upstanding post 15 in the center portion thereof and a recessed portion 16 for receiving a master 17 which forms the cavity 18 with the drier. The said master includes an opening 33 formed in the top portion thereof. Pins 19 and 20 are provided on the drier and fit through openings 21 and 22 in the master to hold same in operable position.

A plurality of the vane elements 10 are removably mounted in the drier and shown in equally spaced relation about the post 15. While the elements 10 may extend through non-illustrated cutouts in the base portion of the drier 14 and in equally spaced relation about the post 15 it is not intended to limit the core-making means to this construction as the vane elements may readily be fashioned to fit in grooves formed on the top side of the drier and removed from the core after removal of the base portion, and furthermore, the elements 10 may be mounted in unequally spaced relation about the post 15.

In accordance with the method of this invention the unitary core may be manufactured from the core-making means shown in FIGURES 8, 9, and 10. To accomplish the foregoing the vane elements 10 are removably positioned in the drier 14 and in equally or unequally spaced relation about the upstanding post 15; the master 17 is then positioned on the drier to form the cavity 18 therewith. Core sand or other suitable refractory material including a suitable binding agent is then packed into the cavity and about the elements 10 through the opening 33 in the top portion of the master. The refractory material is then hardened by any well known method. While hardening of the refractory material is specified, it is not intended to limit the phase of the method to this concept as some types of refractory materials are cured by other well known methods, and it is to be understood that hardening as recited herein includes curing by these methods. Upon completion of the hardening phase of the above described process the core making means 11 are turned over and the drier 14 removed, leaving the core and the bottom of the vane elements 10 exposed in the now inverted master 17 as seen in FIGURE 10. The said vane elements are then removed upwardly from the inverted master by the rotation thereof about the common axis of rotation of vane element withdrawal in the manner and direction indicated by the curved arrow and dashed lines, respectively, in FIGURE 10, and there results a unitary core which is adaptable for use in the manufacture of Francis type impellers.

Although the invention has been described with reference to specific apparatus, it will be appreciated that a wide variety of changes may be made both in the structure and method without departing from the scope of this invention. For example, equivalents may be substituted for the apparatus and the method steps, all within the spirit and scope of the invention as defined in the appended claims.

What is claimed is:

1. A core-making means for a vane of an impeller of the Francis type, said core-making means including a cavity therein, and a vane element of a predetermined design removably mounted in the cavity of said core-making means, said vane element having front and back surface configurations such that cross sections of said vane element taken along spaced parallel planes passed therethrough, each of said spaced parallel planes being parallel in turn to a plane which is tangent to the actual or projected back surface of the vane element, have front and back boundaries which conform substantially to circular arcs having a common axis, whereby said vane element may be withdrawn from a hardened core in said core making means by a twisting, rotary motion.

2. A core-making means for an impeller of the Francis type, said core-making means including a cavity therein, and a vane element of a predetermined design removably mounted in the cavity of said core-making means, said vane element having front and back surface configurations such that cross sections of said vane element taken along spaced parallel planes passed therethrough, each of said spaced parallel planes being parallel in turn to a plane which is tangent to the actual or projected back surface of the vane element, have front and back boundaries which conform substantially to circular arcs having a common axis to permit rotatable removal of said vane element from said cavity, whereby said vane element may be withdrawn from a hardened core in said core making means by a twisting, rotary motion.

3. A core-making means for an impeller of the Francis type, said core-making means including a cavity therein, and a plurality of vane elements of a predetermined design removably mounted in the cavity of said core-making means and in equally spaced relation from each other, said vane elements having front and back surface configurations such that cross sections of each of said vane elements taken along spaced parallel planes passed therethrough, each of said spaced parallel planes being parallel in turn to a plane which is tangent to the actual or projected back surface of the vane element, have front and back boundaries which conform substantially to circular arcs having a common axis to permit rotatable removal of said vane elements out of said cavity, whereby said vane elements may be withdrawn from a hardened core in said core-making means by a twisting, rotary motion.

4. A core-making means claimed in claim 2 wherein the said front and back surfaces of the vane elements are provided with suitable draft to facilitate withdrawal thereof from the core-making means.

5. A core-making means for a vane of an impeller of the Francis type, said core-making means including a drier, a master mounted on said drier to form a cavity therebetween, and a vane element of a predetermined design removably mounted in said drier, said vane element having front and back surface configurations such that cross sections of said vane element taken along spaced parallel planes passed therethrough, each of said spaced parallel planes being parallel in turn to a plane which is tangent to the acutal or projected back surface of the vane element, have front and back boundaries which conform substantially to circular arcs having a common axis to permit rotatable removal of said vane element from said cavity, whereby said vane element may be withdrawn from a hardened core in said core making means by a twisting, rotary motion.

6. A core-making means for an impeller of the Francis type, said core-making means including a drier, a master mounted on said drier to form a cavity therebetween and vane elements of a predetermined dimension removably mounted in said drier, said vane elements having front and back surface configurations such that cross sections of each of said vane elements taken along spaced parallel planes passed therethrough, each of said spaced parallel planes being parallel in turn to a plane which is tangent to the actual or projected back surface of the vane element, have front and back boundaries which conform substantially to circular arcs having a common axis to permit rotatable removal of said vane elements out of said cavity, whereby said vane elements may be withdrawn from a hardened core in said core-making means by a twisting, rotary motion.

7. The core-making means claimed in claim 6 wherein the front and back surface configurations of the vane elements are provided with suitable draft to facilitate withdrawal thereof from the core-making means.

8. A core-making means for an impeller of the Francis type, said core-making means including a circular drier forming a base portion of said core-making means, an open ended master conforming to the shape of said drier and removably mounted thereon to form a cavity with said drier, and vane elements of a predetermined design removably mounted in said drier, said vane elements having front and back surface configurations such that cross sections of each of said vane elements taken along spaced parallel planes passed therethrough, each of said spaced parallel planes being parallel in turn to a plane which is tangent to the actual or projected back surface of the vane element, have front and back boundaries which conform substantially to circular arcs having a common axis to permit rotatable removal of said vane elements out of said cavity, whereby said vane elements may be withdrawn from a hardened core in said core-making means by a twisting, rotary motion.

9. A core-making means for an impeller of the Francis type, said core-making means including a circular drier forming a base portion of said core-making means, a post projecting upwardly from the central portion of said drier, an open ended master conforming to the shape of said drier and removably mounted thereon to form a cavity with said drier, and a plurality of vane elements of a predetermined design removably mounted to said drier, said vane elements having front and back surface configurations such that cross sections of each of said vane elements taken along spaced parallel planes passed therethrough, each of the said spaced parallel planes being parallel in turn to a plane which is tangent to the actual or projected back surface of the vane element, have front and back boundaries which conform substantially to circular arcs having a common axis to permit rotatable removal of said vane elements out of said cavity, whereby said vane elements may be withdrawn from a hardened core in said core making means by a twisting, rotary motion.

10. The core-making means claimed in claim 9 wherein the front and back surfaces of the vane elements are provided with suitable draft to facilitate withdrawal thereof from the core-making means.

11. A vane element for use in forming cores for casting impellers of the Francis type, said vane element having front and back surface configurations such that cross sections of said vane element taken along spaced parallel planes passed therethrough, each of said spaced parallel planes being parallel in turn to a plane which is tangent to the actual or projected back surface of the vane element, have front and back boundaries which conform substantially to circular arcs having a common axis, whereby said vane element may be withdrawn from a hardened core by a twisting, rotary motion.

12. The method of manufacturing a unitary core, for use in casting an impeller of the Francis type, from a core box having a cavity formed therein, said method comprising positioning in said core box vane elements having front and back surface configurations such that cross sections of each of said vane elements taken along spaced parallel planes passed therethrough, each of said spaced parallel planes being parallel in turn to a plane which is tangent to the actual or projected back surface of the vane element, have front and back boundaries which conform substantially to circular arcs having a common axis, packing suitable core material in said cavity and about said vane elements, hardening the core material to form said core, and rotatably removing the vane elements from a hardened core in said core box by a twisting, rotary motion.

13. The method of manufacturing a unitary core, for use in casting an impeller of the Francis type, from a core box including a master and a drier, said method comprising positioning in said drier vane elements having front and back surface configurations such that cross sections of each of said vane elements taken along spaced parallel planes passed therethrough, each of said spaced parallel planes being parallel in turn to a plane which is tangent to the actual or projected back surface of the vane element, have front and back boundaries which conform substantially to circular arcs having a common axis, positioning said master on said drier and about the vane elements to form a cavity with said drier, packing suitable core material in said cavity and about said vane elements, hardening the core material in said core box to form said core, and rotatably removing the vane elements, from a hardened core in said core box by a twisting, rotary motion.

14. The method of manufacturing a unitary core, for use in casting an impeller of the Francis type, from a core box, said method comprising equally spacing in said core box a plurality of vane elements having front and back surface configurations such that cross sections of each of said vane elements taken along spaced parallel planes passed therethrough, each of said spaced parallel planes being parallel in turn to a plane which is tangent to the actual or projected back surface of the vane element, have front and back boundaries which conform substantially to circular arcs having a common axis, packing suitable core material in said core box and about said vane elements, hardening the core material in said core box to form said core, and rotatably removing the hardened vane elements from the core material in said core box by a twisting rotary motion.

15. The method of manufacturing a unitary core, for use in casting an impeller of the Francis type, from a core box including an open ended master and a drier having an upstanding post in the center thereof, said method comprising equally spacing in said drier a plurality of vane elements having front and back surface configurations such that cross sections of each of said vane elements taken along spaced parallel planes passed therethrough, each of said spaced parallel planes being parallel in turn to a plane which is tangent to the actual or projected back surface of the vane elements, have front and back boundaries which conform substantially to circular arcs having a common axis, with said vane elements extending generally radially from said post, positioning said open ended master on said drier and about the vane elements to form a cavity with said drier, packing suitable core material in said cavity and about said vane elements, suitably hardening the core material in said core box to form said core, and rotatably removing the hardened vane elements from the core material in said core box by a twisting, rotary motion.

References Cited by the Examiner

UNITED STATES PATENTS

| | | | |
|---|---|---|---|
| 1,378,524 | 5/21 | Clark | 22—13 |
| 2,887,744 | 5/59 | Halliday | 22—53 |

FOREIGN PATENTS 1,032,898  6/58  Germany.

MARCUS U. LYONS, *Primary Examiner.*